United States Patent [19]

Oishi et al.

[11] Patent Number: 5,935,717
[45] Date of Patent: Aug. 10, 1999

[54] FUNCTIONAL FILM HAVING INORGANIC THIN ON SURFACE OF ORGANIC FILM ARTICLE USING THE SAME AND PROCESS FOR PRODUCING THE SAME

[75] Inventors: Tomoji Oishi; Takao Ishikawa; Daigorou Kamoto, all of Hitachi; Ken Takahashi, Tokai-mura; Chikako Yoshioka, Hitachi, all of Japan

[73] Assignee: Hitachi, Ltd., Tokyo, Japan

[21] Appl. No.: 08/880,655

[22] Filed: Jun. 23, 1997

[30] Foreign Application Priority Data

Jun. 28, 1996 [JP] Japan ................................ 8-169620
Sep. 4, 1996 [JP] Japan ................................ 8-233851

[51] Int. Cl.$^6$ ............................ B32B 27/06; B32B 27/36
[52] U.S. Cl. ...................... 428/480; 427/121; 427/126.2; 427/126.3; 427/229; 427/379; 427/553; 428/1; 428/332; 428/532; 428/689
[58] Field of Search ............................ 427/121, 126.2, 427/126.3, 58, 229, 379, 553; 428/1, 332, 480, 532, 689

[56] References Cited

U.S. PATENT DOCUMENTS

| 4,702,963 | 10/1987 | Phillips et al. ................... 428/35.3 X |
| 5,188,876 | 2/1993 | Hensel et al. ...................... 428/76 |
| 5,234,556 | 8/1993 | Oishi et al. . | |
| 5,271,952 | 12/1993 | Liang et al. ...................... 427/121 X |
| 5,318,800 | 6/1994 | Gong et al. ...................... 427/229 |
| 5,403,616 | 4/1995 | Hattori et al. ...................... 427/558 X |
| 5,421,926 | 6/1995 | Yukinobu et al. ................... 156/83 |
| 5,460,877 | 10/1995 | Oishi et al. . | |
| 5,504,133 | 4/1996 | Murouchi et al. ................... 252/511 X |
| 5,643,642 | 7/1997 | Oishi et al. . | |
| 5,662,962 | 9/1997 | Kawata et al. ...................... 427/126.2 |

FOREIGN PATENT DOCUMENTS 06-139964  6/1994  Japan .

OTHER PUBLICATIONS

"New Glass", vol. 3, No. 3, p. 25 (1989).

*Primary Examiner*—Michael Lusignan
*Attorney, Agent, or Firm*—Antonelli, Terry, Stout & Kraus, LLP

[57] ABSTRACT

The present invention provides a functional film composed of an organic film having a low heat resistance and an inorganic thin film in which functional particles such as photocatalytic particles or conductive particles are dispersed, the inorganic thin film being formed on the organic film. The functional film is stuck on the surface of, for example, a CRT display with a pressure-sensitive adhesive or the like for simply securing antireflection and antistatic effects of the CRT display. The functional film including an inorganic thin film in which photocatalytic particles are dispersed, is stuck on wallpaper or the like for simply securing deodorant and stainproofing effects of the wallpaper.

35 Claims, 6 Drawing Sheets

(BACKLIGHT)

CROSS-SECTIONAL VIEW

FUNCTIONAL FILM HAVING INORGANIC THIN ON SURFACE OF ORGANIC FILM ARTICLE USING THE SAME AND PROCESS FOR PRODUCING THE SAME

BACKGROUND OF THE INVENTION

The present invention relates to an article produced by forming an inorganic thin film on an organic film, which is particularly applicable as a functional film by dispersing inorganic particles having a photocatalytic function, an antistatic function, and/or a light reflectance changing function in the inorganic thin film; a process for producing the article; and a product using the article.

An attempt has been made to coat an organic film with an inorganic thin film for enhancing the optical function of the film, as disclosed in a document "New Glass, Vol. 13, No. 3, p. 25 (1989)". Such a film has been known as a transparent conductive film. The coating of the inorganic thin film has been performed by sputtering.

Japanese Patent Laid-Open No. Hei 6-139964 discloses a cathode-ray tube with a functional film. The function film, which is produced by forming a thin film having a antireflection effect or a wavelength-selective absorption effect on a basic film, is adhesively bonded on a CRT. More specifically, the functional film is produced by forming a multi-layered thin film on the basic film by vacuum evaporation. However, there is disclosed a process of producing such a functional film by coating a basic film with a sol solution by spray coating.

A technique of producing a tile and the like having an antibacterial effect using a film having a photocatalytic function has been known, for example, from a document "FC Report, Vol. 113, No. 7, p. 195 (1995)". In this technique, a heat-resistant substrate such as a glass substrate or a tile is coated with a sol of titanium oxide, and is subjected to heat treatment at several hundred °C., whereby a titanium oxide thin film having a photocatalytic function is formed on the substrate. Also, there has been known a refrigerator including an ozone deodorizing device capable of decomposing malodorous components in the refrigerator.

A process of forming an inorganic film on a basic film by sputtering or vacuum evaporation has problems in requiring a large-scaled vacuum apparatus, being unsuitable for formation of a large-area film, and being high in cost of film formation. Sputtering has another problem that since a thin film is formed in argon plasma, the film is possibly destroyed due to reverse sputter of the film by argon plasma.

As the other film formation process, CVD (chemical vapor deposition) has been known. The CVD process, however, has a problem in that it is difficult to form an inorganic film on a large-area basic film because of a high film formation temperature. In particular, it is difficult to form an inorganic film on an organic film having a low heat resistance by the above-described known process.

A technique may be considered, in which an inorganic film is formed on the surface of a basic film by vacuum evaporation while cooling the surface of the basic film; however, such a technique requires a considerably special attachment device. Further, an inorganic thin film formed by vacuum evaporation is very weak in strength in the lateral direction of the film because the film has a columnar structure.

On the other hand, there has been known a technique of coating a basic film with a sol solution of inorganic particles by spray coating, followed by heat treatment, to form an inorganic thin film on the basic film. The technique, however, has following problems. The surface of the inorganic thin film is liable to be uneven so that it possibly deteriorates the transmittance of light from a phosphor when used for a display unit. Further, the adhesion strength of the inorganic thin film to the organic film is very low because the organic film cannot be heat-treated at a high temperature.

CRTs of a type having an antireflection/antistatic film have been known. In most cases, such a film is directly formed on the surface of a CRT face glass. In other words, the CRT is not of a type in which an organic film on which an antireflection/antistatic film is previously formed is provided on the surface of the CRT face glass. Additionally, a process of forming an antireflection/antistatic film on the CRT face glass by spin coating or spray coating has a problem in taking a lot of labor, thereby making poor the productivity.

As for a tile or the like on which a film of titanium oxide having a photocatalytic function is formed as described above, the film is formed by coating the tile with a titanium oxide sol solution by spraying, and heat-treating the resultant tile at several hundred °C. Accordingly, it is difficult to form the above titanium oxide film on an organic film having a low heat resistance and to provide the organic film on a tile.

There have been not known techniques of forming a film having a photocatalytic function to exhibit an antibacterial effect on wallpaper, a construction material, an air conditioner, a refrigerator, etc.

SUMMARY OF THE INVENTION

An object of the present invention is to provide a functional film composed of an organic film; and an inorganic thin film in which inorganic particles having various functions are dispersed in the inorganic thin film, the inorganic thin film being formed on the organic film, whereby, for example, an antireflection function is simply imparted to a CRT by sticking the functional film to the surface of the CRT panel.

Another object of the present invention is to provide a convenient functional film having a highly generalized photocatalytic function by forming an inorganic thin film capable of exhibiting a high photofunction on an organic film having a low heat resistance at a low temperature.

The above-described functional film can be applied to wallpaper, a refrigerator, an air conditioner, a construction material, a heat exchanger, and other articles; and further applied to apparatuses.

A further object of the present invention is to provide a convenient organic film having a highly generalized photofunction which is produced by forming an inorganic thin film capable of exhibiting a high photofunction on an organic film having a low heat resistance at a low temperature, and to provide a process of producing the organic film.

An additional object of the present invention is to provide a display unit using the above-described organic film having a highly generalized photofunction.

The most important subject to form a functional inorganic film on an organic film is to develop a low-temperature film forming technology. To achieve such a subject, the present inventors have developed a photofunctional organic film by a sol-gel method using light irradiation. In the sol-gel method, an inorganic film is formed at a low temperature by promoting a sol-gel reaction with light energy. Such a process allows a functional inorganic thin film to be formed on an organic film having a low heat resistance. In an ordinary sol-gel reaction, an organometallic compound cannot be formed into an inorganic thin film unless it is heated to at least 400° C. However, since an organic film cannot withstand a temperature of more than about 300° C., the conventional sol-gel method cannot be applied to a process of forming an inorganic thin film on the organic film.

A further feature of the present invention is to homogeneously disperse fine particles having a photocatalytic function or the like in an inorganic thin film. Fine particles are usually aggregated into secondary particles by surface tension due to a slight amount of moisture present on the surfaces of the fine particles, intermolecular force, and the like. Specifically, even if an inorganic thin film is formed using fine particles having the primary particle size of the order of submicrons, particles having a secondary particle size of a few tens to several hundreds of microns are actually dispersed in the inorganic thin film.

On the other hand, according to the present invention, by irradiating a solution containing at least two different organometallic compounds with electromagnetic waves (light), inorganic particles are formed from one organometallic compound while an inorganic thin film as a dispersion medium for the inorganic particles is formed from the other organometallic compound, whereby particles having a fine particle size (500 Å or less) can be dispersed homogeneously. Functional particles cannot sufficiently exhibit their function unless they are finely dispersed. For example, it has been found out that the visible light transmittance of an inorganic thin film is suddenly reduced when the particle size of the dispersed particles exceeds 500 Å and that the visible light transmittance is reduced to about 70% when the particle size of the dispersed particles is one micron. In such an inorganic thin film, the efficiency of a photocatalytic reaction promoting a decomposition reaction of an organic material by light irradiation is reduced, with a result that the inorganic thin film cannot exhibit a sufficient performance.

Thus, it is very important that fine particles are homogeneously dispersed in an inorganic thin film. In this respect, according to the present invention, it has been found out that fine particles can be homogeneously dispersed in an inorganic thin film by the above-described process.

Further, by adding previously-prepared inorganic particles to be dispersed, to a solution of an organometallic compound and irradiating the solution with light, the inorganic particles can be finely, homogeneously dispersed because secondary particles are dispersed in the form of primary particles when a sol-gel reaction occurs.

In some applications, the adhesive bonding strength of an inorganic thin film to an organic film is so insufficient that the inorganic thin film is possibly peeled therefrom during use. To prevent such peeling of the inorganic thin film from the organic film, an inorganic adhesive bonding layer may be interposed between the organic film and the inorganic thin film.

To produce a film capable of exhibiting a photofunction, such as an antireflection film, multiple inorganic films may be formed on the surface of an organic film. For example, it is sometimes desired that an inorganic thin film having a high refractive index be formed on the organic film surface and then an inorganic thin film having a low refractive index be formed thereon.

The refractive index of an inorganic thin film can be changed not only by changing the material of the inorganic thin film but also by changing the dispersibility of the particles dispersed in the inorganic thin film.

For producing an inorganic thin film having an antistatic function, it is effective to use dispersed particles of a conductive material. Specific examples of the conductive materials may include $In_2O_3$, $SnO_2$, ZnO, $TiO_2$, and $SiO_2$.

Before formation of an inorganic thin film on a basic film, the surface of the basic film may be treated with a silane coupling agent or the like to form an intermediate inorganic layer on the surface of the basic film. As a result, the adhesion strength between the basic film and the inorganic thin film can be improved. This is advantageous in terms of practical use.

The above-described film forming process of the present invention is a very simple without use of any large-scaled vacuum apparatus required for sputtering, CVD, vacuum evaporation, etc.

The photocatalytic function of an inorganic thin film of the functional film according to the present invention can decompose organic components such as various germs and malodorous components. Such a thin film also has an antibacterial function. Titanium oxide is preferably used for the material of inorganic particles having the above photocatalytic function. However, the present invention is not limited thereto, and for example, niobium oxide may be used in place of titanium oxide. Further, a noble metal such as Ag, Pt, Au, Rh, Pd, Ru, or Cu may be incorporated in the inorganic thin film. This exhibits a very high effect by combination of the photocatalytic function of the oxide and the catalytic function of the noble metal. The crystal system of titanium oxide of an anatase type exhibits a high antibacterial effect due to the excellent photoelectric current properties thereof. However, titanium oxide of a rutile type may also be used because addition of a noble metal thereto can enhance the effect thereof.

Such an antibacterial film can be used for products having a variety of novel functions. Specifically, the present invention provides wallpaper, a refrigerator, an air conditioner, and a construction material, each of which uses the antibacterial film.

DETAILED DESCRIPTION OF THE PREFERABLE EMBODIMENTS

An inorganic thin film is formed on an organic film by a manner of dispersing inorganic particles having various functions in a sol solution, coating the organic film with the sol solution, and irradiating the sol solution with light. At this time, when the sol is converted into the inorganic thin film by light irradiation, the inorganic particles having the photofunction are fixed in the inorganic thin film. As a result, the inorganic thin film having the photofunction can be formed on the organic film.

An inorganic thin film can be also obtained using a sol solution of a metal alkoxide as the starting material of inorganic particles to be dispersed, in place of the sol solution in which inorganic particles are dispersed. In this case, it is effective that the sol solution of a metal alkoxide is irradiated with light in the ultraviolet region, that is, the region of absorption wavelengths of an ordinary metal alkoxide.

The above ultraviolet rays allow a hydrolysis reaction and a condensation reaction as the basic reactions of the sol-gel reaction to effectively proceed, whereby the desired inorganic thin film can be obtained.

A surface of an organic film on which the above inorganic thin film is to be formed, may be treated with a silane coupling agent or the like to form an intermediate inorganic layer on the surface of the organic film. As a result, the adhesion strength of the inorganic thin film to the organic film can be improved. This is advantageous in terms of practical use.

The above-described inorganic thin film forming process is very economical because it does not use a large-scaled vacuum apparatus required for sputtering, CVD, vacuum evaporation, etc.

As the above inorganic particles, there can be used at least one kind selected from a group consisting of $In_2O_3$, $SnO_2$, ZnO, $TiO_2$ and $SiO_2$. The particle size of the inorganic particles is preferably in a range of 500 Å or less. In particular, particles of $In_2O_3$, $SnO_2$ or ZnO is effective to form an antistatic film because of their conductivity.

The film of the present invention may be of a multi-layered structure having a high refractive index layer and a low refractive index layer. In such a multi-layered film, the reflected rays of light can be offset $\lambda/4$ each layer by controlling the thickness and the refractive index of each layer. Consequently, the reflected rays in the layers are canceled by the interference effect of light, whereby the antireflection effect of the film can be exhibited.

A photofunctional organic film having both of an antireflection function and an antistatic function can be obtained using inorganic particles having a conductivity for the high refractive index layer.

The photofunctional organic film of the present invention can be provided on the surface of the face of a liquid crystal display unit, a CRT or the like for giving an antireflection function or an antireflection/antistatic function thereto.

The inorganic thin film formed on the organic film according to the present invention is greatly different in structure from a thin film formed by conventional vacuum evaporation or sputtering. Specifically, the thin film formed by vacuum evaporation or sputtering has a columnar cross-sectional film structure, and thereby the film strength is very weak against movement of the film in the lateral direction. On the other hand, the inorganic thin film of the present invention is adhesively bonded onto a basic film by preparing a sol solution in which ultra-fine particles (particle size: 500 Å or less) are dispersed and coating the basic film with the sol solution as an inorganic binder, and accordingly the cross-sectional structure of the inorganic thin film is in the laminated form of aggregates of fine particles. As a result, the film has a high allowance against lateral movement as well as interparticle movement, so that the film becomes very high in strength and incomparably excellent in flexibility.

The organic film is desired to be made from polyethylene terephthalate (PET), but it may be made from a different material such as triacetyl cellulose (TAC) in accordance with the purpose.

The organic film of the present invention having a high photofunction may be used in such a manner as to be adhesively bonded on the surface of the face of a display unit with an adhesive. In this case, there may be used commercially available transparent adhesives, for example, vinyl acetate, acrylic, hot-melt, urea resin, phenolic resin, epoxy resin, polyurethane resin, and hot-melt resin adhesives.

EMBODIMENT 1

Tetraethoxysilane, water, ethanol and nitric acid were mixed together at a molar ratio of 1:12:45:0.25 to prepare an $SiO_2$ sol solution. Ultra-fine ITO (Indium-Tin-Oxide) particles (particle size: 50 to 300 Å) containing 2 wt % of Sn were dispersed in 100 ml of the above $SiO_2$ sol solution while adjusting the acidity of the solution to prepare a 7 wt % ITO-dispersed sol solution.

An applicable surface of a PET film, which was treated with a silane coupling agent to form a silica layer of 300 Å in thickness thereon, was dipped in the above ITO-dispersed sol solution, to form an ITO thin film thereon, followed by drying of the film at 50° C. for two minutes.

Subsequently, the film was then dipped in a 1 wt % $SiO_2$ sol solution synthesized using tetraethoxysilane as the starting material, to form a $SiO_2$ film thereon, followed by drying of the film at 50° C. for two minutes.

The resultant film was irradiated with ultraviolet rays of 245 nm, 184 nm for 3 minutes. During this light irradiation, the temperature of the base film was set at 50 ° C. The surface resistance of the resultant film was $5 \times 10^6$ Ω/□. The surface reflectance of the film was 0.35% (570 nm).

The cross-sectional structure of this film was observed using a transmission electron microscope (TEM). A sample for TEM observation was prepared by FIB (Focused Ion Beam) processing.

Figure 1:
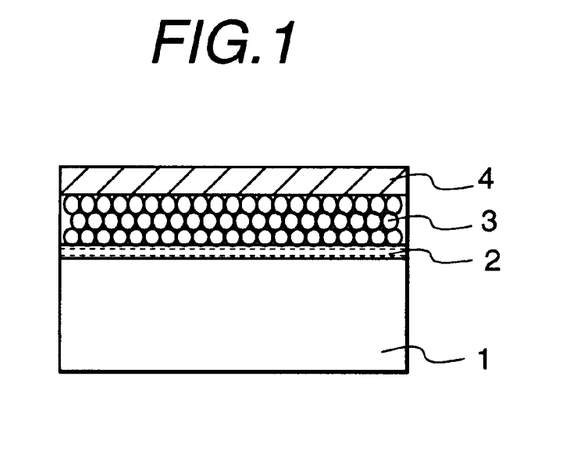
FIG. 1 is a typical cross-sectional view showing TEM (transmission electron microscope) observation of the photofunctional organic film of the present invention.
Figure 2:
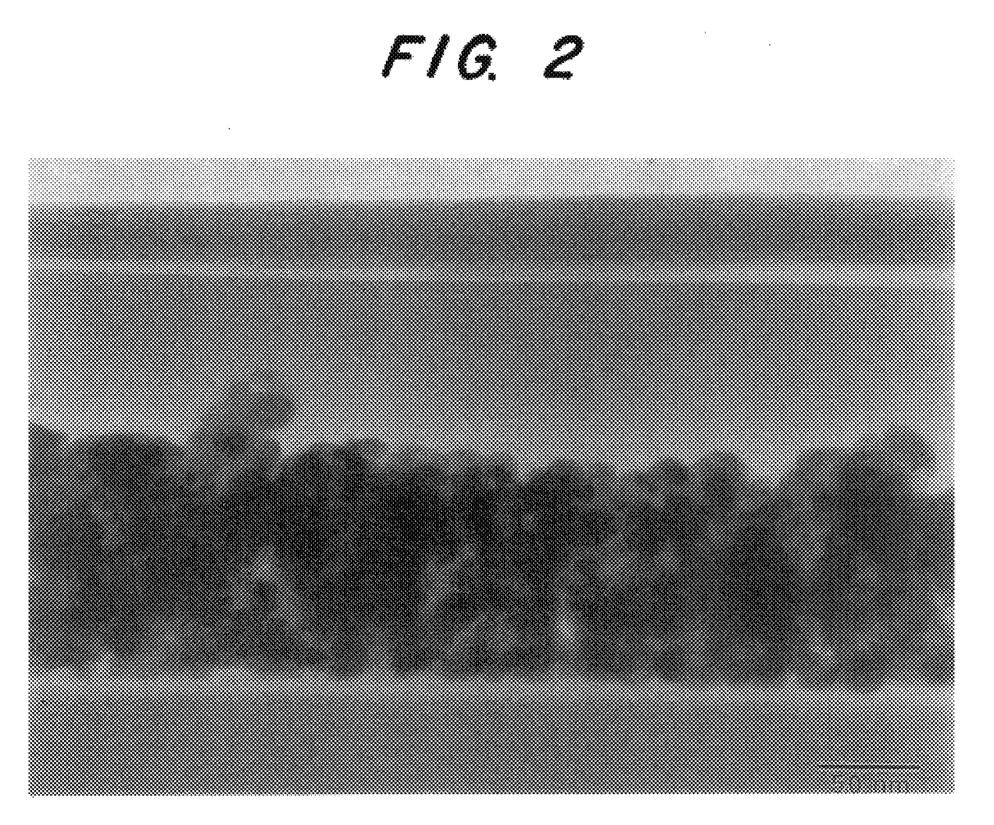
FIG. 2 is a TEM photograph of a cross section of the photofunctional organic film of the present invention.

FIG. 1 is a view showing a typical cross-sectional structure of this film. FIG. 2 is a TEM photograph of an actual cross section of this film. In FIG. 1, reference numeral 1 indicates the organic film; 2 is a silane coupling agent layer, 3 is inorganic particles ($In_2O_3$); and 4 is a silica layer. It was observed that ITO and $SiO_2$ films of 1,000 Å and 800 Å in thickness were homogeneously formed on the organic film 1, respectively.

Particles having a particle size of 50 to 300 Å were also observed in the ITO film. Since the particle size of the particles is far smaller than the visible light wavelengths, the thin film becomes transparent. The refractive indices of ITO and $SiO_2$ were 1.70 and 1.42, respectively. Accordingly, the antireflection/antistatic film provided on the surface of the face plate of a liquid crystal display unit or a CRT was satisfactory to prevent the surface reflection and static electricity without scattering of either transmitted light or light of a phosphor.

A film having an antistatic effect and an antireflection effect similar to the above effects was obtained using either $SnO_2$ (containing Sb) or ZnO (containing Al) in place of ITO.

EMBODIMENT 2

Figure 3:
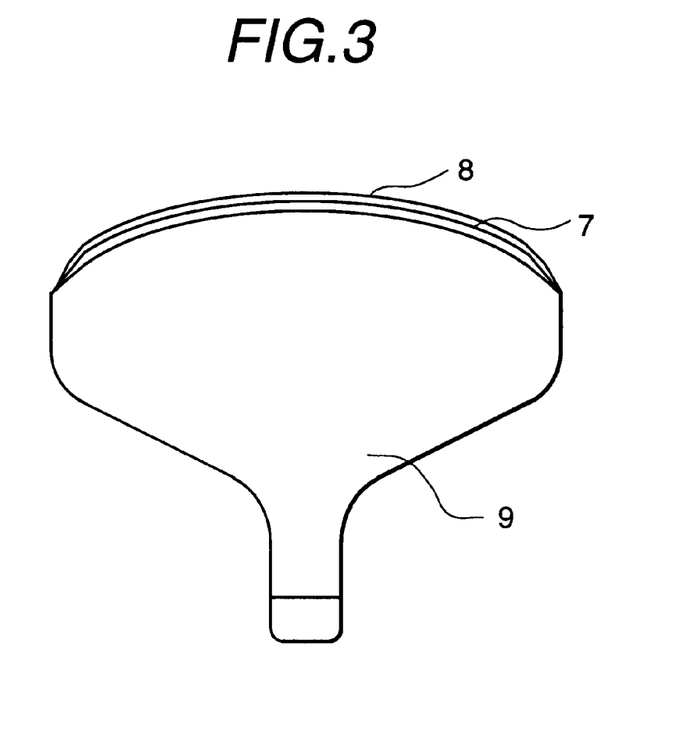
FIG. 3 is a typical cross-sectional view of a cathode-ray tube to which the present invention is applied.

The organic film having antireflection and antistatic functions, prepared in EMBODIMENT 1, was stuck on the surface of the face plate of a CRT (17-inch cathode-ray tube) as shown in FIG. 3. In FIG. 3, reference numeral 7 indicates the organic film; 8 is the inorganic thin film; and 9 is the cathode-ray tube.

In the CRT with the antireflection/antistatic film provided on the surface thereof, since the reflection of external light from the surface of the face plate was suppressed, the visibility was extremely improved. Also, since static electricity was removed by the antistatic function of the antireflection/antistatic film, adhesion of dust onto the surface of the face plate of the CRT was diminished, and also a person was protected from electric shock even when he touched the surface of the face plate.

EMBODIMENT 3

Figure 4:
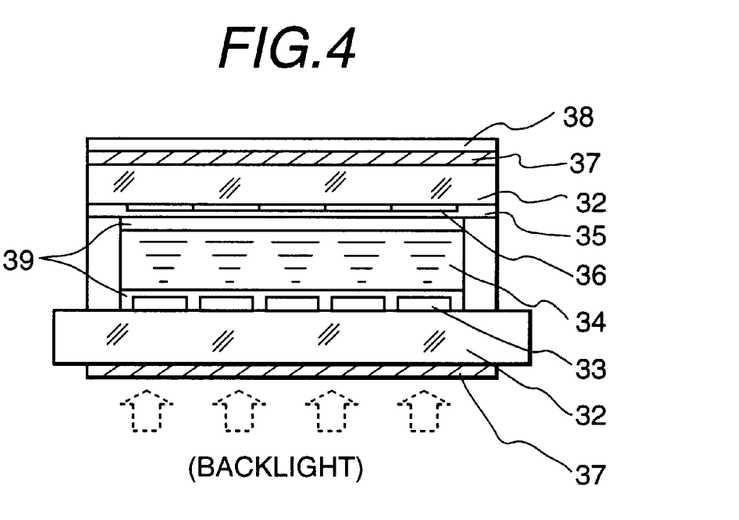
FIG. 4 is a typical cross-sectional view of a liquid crystal display unit to which the present invention is applied.

The organic film having antireflection and antistatic functions, prepared in EMBODIMENT 1, was stuck on a polarizing plate provided on the display surface of a liquid crystal display unit as shown in FIG. 4. In FIG. 4, reference numeral 32 indicates a glass substrate; 33 is pixel electrodes; 34 is a liquid crystal layer; 35 is a counter electrode; 36 is color filters; 37 is the polarizing plate; and 38 is the organic film prepared in EMBODIMENT 1 and stuck on the polarizing plate with a pressure-sensitive adhesive.

In this liquid crystal display unit, since the reflection of external light at the surface of the face plate was suppressed, the visibility was extremely improved.

EMBODIMENT 4

Figure 5:
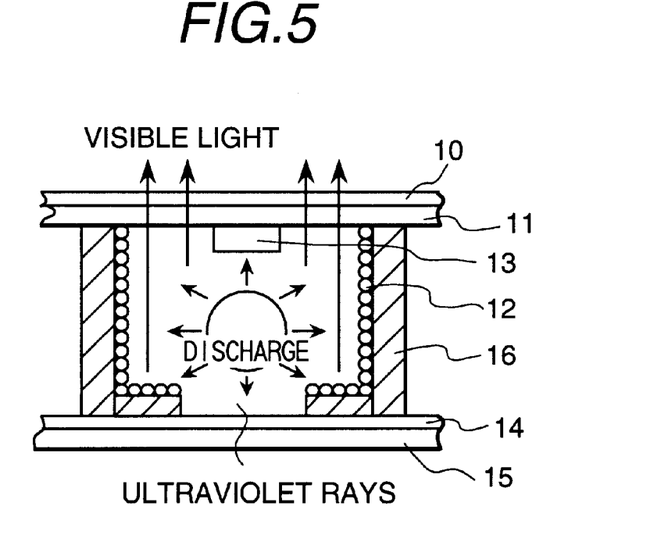
FIG. 5 is a cross-sectional view of a plasma display panel to which the present invention is applied.

The organic film prepared in EMBODIMENT 1 was stuck on the panel surface of a plasma display panel (PDP) as shown in FIG. 5. The plasma display panel gives a display when a high-voltage current is discharged between a cathode 13 and an anode 14 to generate a fluorescence from a phosphor 12 applied on the inner surface of a partition wall 16. In FIG. 5, reference numeral 11 indicates a front plate for transmitting a displayed light therethrough and 15 is a back plate. Although one cell for displaying one pixel is shown in FIG. 5, such cells are disposed two-dimensionally in the actual PDP to display information. In the case of PDP, the organic film 10 prepared in EMBODIMENT 1 was stuck on the front plate 11 similarly to CRT, whereby a high contrast display with little reflection into the frame was attained. Of course, an antistatic effect can also be secured using the organic film 10 having on the surface a thin film in which conductive particles are dispersed.

EMBODIMENT 5

Tetraethoxysilane, water, ethanol and nitric acid were mixed together at a molar ratio of 1:12:45:0.25 to prepare an $SiO_2$ sol solution. Ultra-fine $TiO_2$ particles (particle size: 70 to 500 Å) were dispersed in 100 ml of the solution while adjusting the acidity thereof, to prepare a 7 wt % $TiO_2$-dispersed sol solution.

A PET (polyethylene terephthalate) film was then dipped in the above $TiO_2$-dispersed sol solution, to form an $TiO_2$ thin film thereon, followed by drying of the film at 50° C. for two minutes. Next, the resultant film was irradiated with ultraviolet rays of 245 nm, 184 nm for three minutes. During light irradiation, the temperature of the substrate film was set at 50° C.

On the other hand, a PET film was treated with a silane coupling agent to form a thin silica layer on the film, and a film was formed from the $TiO_2$-dispersed solution on the thin silica layer. In this case, there was obtained a photo-functional film having a desirable wettability and an excellent film formation state. This film was improved in adhesion of the $TiO_2$ film to the PET film to such an extent that the adhesion strength thereof was 1.6 times as high as that of the film obtained without treatment with the silane coupling agent.

On this film, is formed ultra-fine $TiO_2$ particles having a photocatalytic function. *Escherichia coli* was put on this film to examine the antibacterial effect of the $TiO_2$ film during irradiation with ultraviolet rays.

Figure 6:
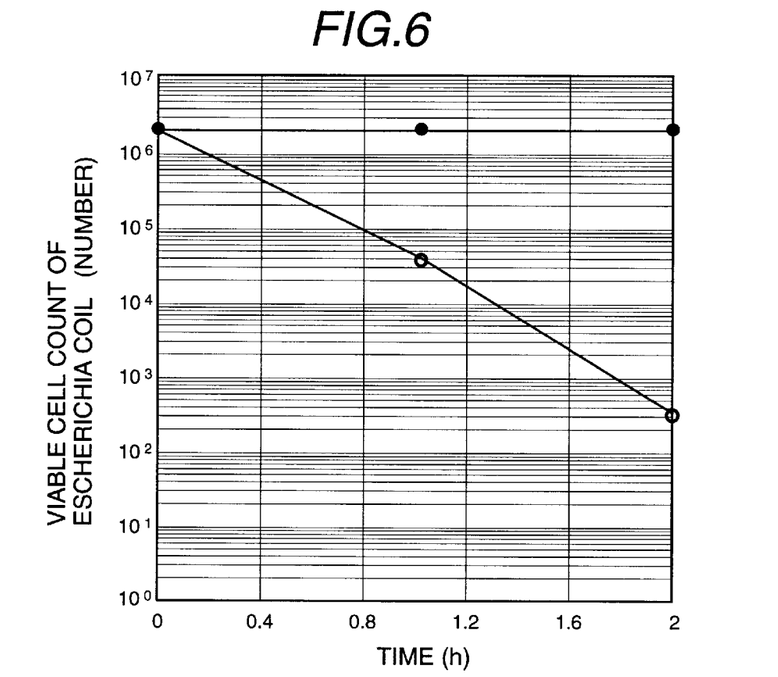
FIG. 6 is a diagram showing the test results of the antibacterial properties of the organic film of the present invention.

*Escherichia coli* was also put on a film having no $TiO_2$ film for comparison. Thus, each film was examined in terms of changes in viable cell count of *Escherichia coli* with the lapse of time. The test results are shown in FIG. 6. For the PET film having the $TiO_2$ film, the viable cell count of *Escherichia coli* was decreased to $1/10^4$ or less of the original count after two hours, whereas for the PET film having no $TiO_2$ film, the viable cell count of *Escherichia coli* was hardly decreased.

The same effect was obtained using an $Nb_2O_3$-dispersed solution instead of the $TiO_2$-dispersed solution.

EMBODIMENT 6

Figure 7:
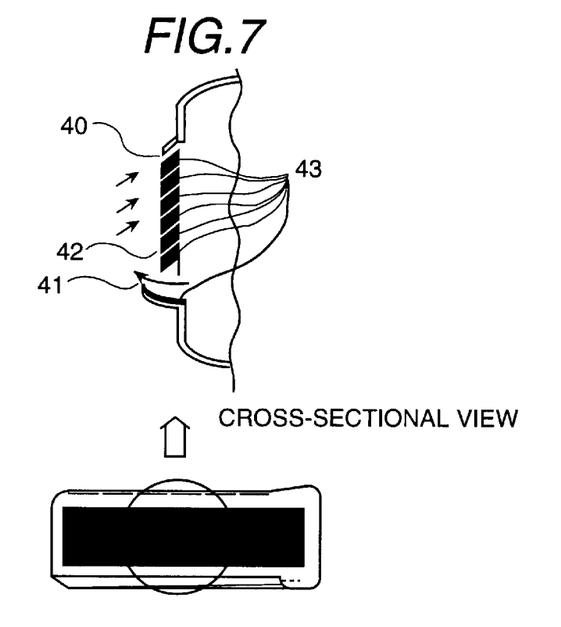
FIG. 7 is a typical cross-sectional view of a fin of an air conditioner with the antibacterial film of the present invention.

An air conditioner can be provided with a function of decomposing mildew, ticks, malodorous components, etc. to create clean air. The organic film with a $TiO_2$ film having a photocatalytic effect, prepared in EMBODIMENT 5, was adhesively bonded on an air discharge port fin of an air conditioner. FIG. 7 is a cross-sectional view of the air conditioner. In FIG. 7, reference numeral 40 indicates a suction port; 41 is an air discharge port; 42 is the fin; and 43 is an antibacterial film.

In cooling air or warming air discharged from this air conditioner, the amount of organic substances such as mildew, ticks and malodorous components was suppressed to 1/10 or less of that in an air conditioner with no photocatalytic film.

EMBODIMENT 7

The organic film with a $TiO_2$ film having a photocatalytic effect, prepared in EMBODIMENT 5, was adhesively bonded on an inner side surface of a refrigerator. Mercury lamps having low light intensity were also set near the film in the refrigerator.

Figure 8:
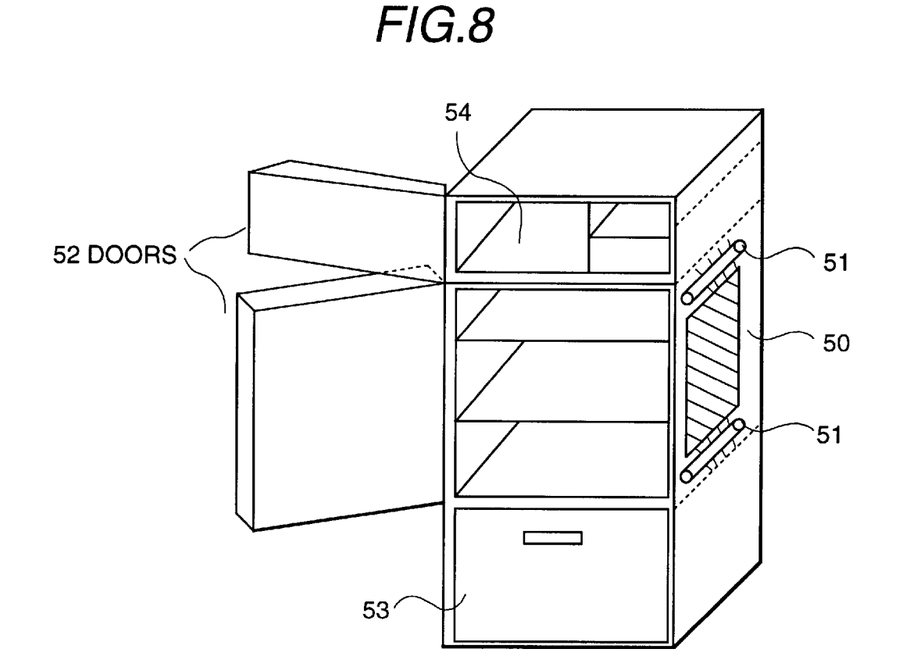
FIG. 8 is a typical perspective view of a refrigerator with the antibacterial film of the present invention.

FIG. 8 is a perspective view showing the structure of the refrigerator with the antibacterial film. In FIG. 8, reference numeral 50 indicates the antibacterial film; 51 is the mercury lamps; 52 is a door; 53 is a vegetable chamber; and 54 is the refrigerator.

Since various malodorous components generated in the refrigerator were decomposed by the effect of the film having a photocatalytic function, the refrigerator was never filled with any malodors. This film having a photocatalytic function, after being turned ineffective, can be simply replaced by a new one, so that the deodorant effect thereof in the refrigerator can be maintained efficiently.

EMBODIMENT 8

The organic film with a $TiO_2$ film having a photocatalytic effect, prepared in EMBODIMENT 5, was adhesively bonded on the surface of various construction materials. When the construction material thus treated was applied onto the wall surface of a building, harmful gases such as NOx discharged from cars and the like could be decomposed. Thus, it was confirmed that the film is effective as a catalyst for purification of the environment.

EMBODIMENT 9

When the $TiO_2$ particles were dispersed in EMBODIMENT 5, 0.1 wt % of $AgNO_3$ was added thereto. Thus, there was obtained an organic film having a $TiO_2$ film incorporated with Ag. As a result of examination of the antibacterial effect of this film, the effect thereof was increased to about 1.3 times that of the film added with no Ag. The same additional effect can be obtained even by replacing Ag with Au, Pt, Cu, Rh, Ru or the like.

EMBODIMENT 10

Figure 9:
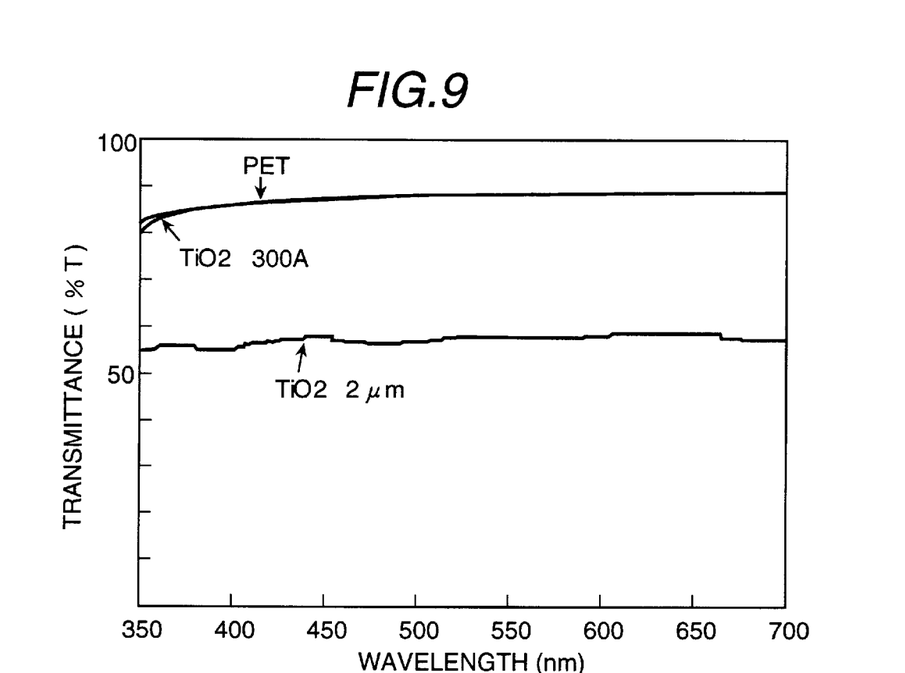
FIG. 9 is a diagram showing the results of examination of the light transmittance of each $TiO_2$ film varied in the particle size of dispersed particles when the wavelength of light is varied.

Inorganic thin films were examined in terms of the relationship between the particle size of particles dispersed in the thin inorganic film and the light transmittance thereof. Each film was irradiated with a light having a wavelength of 350 nm to 700 nm to examine the light transmittance thereof. As test samples, there were used three kinds of films: a PET (polyethylene terephthalate) film alone; a PET film having on the surface an inorganic thin film in which titanium oxide particles having a particle size of 300 Å were dispersed; and a PET film having on the surface an inorganic thin film in which titanium oxide particles having a particle size of 2 μm were dispersed. The results are shown in FIG. 9. For the PET film (particle size of titanium oxide: 300 Å), the light transmittance was hardly reduced as compared with that of the PET film alone. On the other hand, for the PET film (particle size of titanium oxide: 2 μm), the light transmittance was reduced to about 55% of that of the PET film alone. When the light transmittance of the film is reduced to 70% or less, the film is turned into a so-called cloudy state. Accordingly, for the film having an inorganic thin film in which photocatalyst particles are dispersed, if the light transmittance of the film is reduced to 70% or less, only part of the photocatalyst particles in the vicinity of the surface acts, so that the efficiency of the film is reduced, with a result that the usability of the film is significantly reduced.

Figure 10:
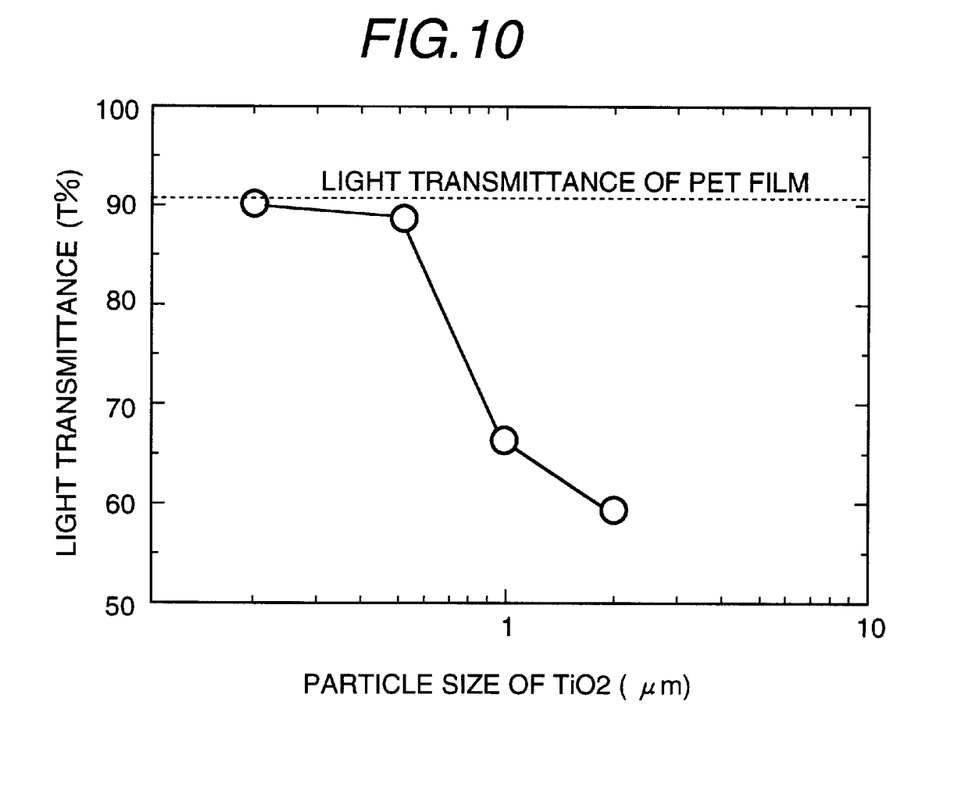
FIG. 10 is a diagram showing the results in FIG. 9 which are replotted in the coordinates wherein the abscissa indicates the particle size of dispersed particles and the ordinate indicates the light transmittance.

FIG. 10 shows the results of FIG. 9 which are replotted in the coordinates wherein the abscissa indicates the particle size of titanium oxide and the ordinate indicates the light transmission. As is apparent from FIG. 10, an inorganic thin film can be formed on a PET film in such a manner that the light transmittance of the film is little attenuated, by specifying the particle size of dispersed particles in the range of 500 Å (0.5 μm) or less.

What is claimed is:

1. A functional film comprising:
an organic film; and
an inorganic thin film, of an inorganic material, in which a number of inorganic particles are dispersed, said inorganic thin film being formed on said organic film, and said inorganic particles have a particle size of 500 Å or less.

2. A functional film according to claim 1, wherein said organic film has a heat resistance withstanding a temperature of 300° C. or less.

3. A functional film according to claim 1, wherein said particles comprise conductive particles.

4. A functional film according to claim 1, including an intermediate inorganic layer between said organic film and said inorganic thin film.

5. A functional film according to claim 1, wherein said inorganic thin film is a film formed by decomposing organometallic compounds.

6. A functional film according to claim 1, wherein the inorganic particles are homogeneously dispersed in the inorganic thin film.

7. A functional film according to claim 1, wherein said particles are $TiO_2$ particles, $SiO_2$ particles, $Nb_2O_3$ particles, $In_2O_3$ particles, $SnO_2$ particles, or ZnO particles.

8. A functional film according to claim 7, wherein said particles are crystalline particles.

9. A display unit of a type in which display is performed by modulation of an emission light or a reflected light comprising a functional film on a display panel,
wherein said functional film comprises an organic film and an inorganic thin film, of an inorganic material, in which a number of inorganic particles are dispersed, said inorganic thin film being formed on said organic film, and said inorganic particles have a particle size of 500 Å or less.

10. A display unit according to claim 9, including an intermediate inorganic layer between said organic film and said inorganic thin film.

11. A display unit according to claim 9, wherein said inorganic thin film has a multi-layered structure of two or more of layers.

12. A antibacterial film comprising:
an organic film; and
an inorganic thin film of an inorganic material, in which particles, mainly of titanium oxide particles, are dispersed, said inorganic thin film being formed on said organic film, and said titanium oxide particles have a particle size of 500 Å or less.

13. An antibacterial film according to claim 12, wherein said titanium oxide has an anatase crystal structure.

14. An antibacterial film according to claim 12, wherein said inorganic thin film including at least one metal element of Ag, Au, Pt, Cu, Rh, or Ru.

15. A wallpaper material having the antibacterial film of claim 12.

16. A refrigerator having the antibacterial film of claim 12.

17. An air conditioner having the antibacterial film of claim 12.

18. A construction material having the antibacterial film of claim 12.

19. A process for producing a functional film comprising:
a step of coating an organic film with a sol solution; and
a step of irradiating said sol solution on the organic film with electromagnetic waves, wherein said sol solution includes an organometallic compound, and said organometallic compound forms an inorganic particle.

20. Product formed by the process of claim 19.

21. A method according to claim 19, wherein the step of coating the organic film includes a step of forming an intermediate inorganic layer on said organic film, and coating said intermediate inorganic layer with the sol solution.

22. A process for producing a functional film comprising:

a step of coating an organic film with a sol solution to form a sol solution on an organic film; and a step of irradiating said sol solution on an organic film with electromagnetic waves, wherein said sol solution includes inorganic particles, and said inorganic particles are dispersed in said sol solution.

23. Product formed by the process of claim 22.

24. A method according to claim 22, wherein said sol solution includes an organometallic compound, and said inorganic particles are dispersed in said organometallic compound.

25. A method according to claim 24, wherein said particles are dispersed homogeneously in said organometallic compound.

26. A method according to claim 22, wherein the step of coating the organic film includes a step of forming an intermediate inorganic layer on said organic film, and coating said intermediate inorganic layer with the sol solution.

27. A process for producing a functional film, comprising the steps of:

irradiating a solution containing at least two kinds of organometallic compounds and water with electromagnetic waves having a specific wavelength necessary for destruction of bonds between metallic atoms and organic groups of said organometallic compounds;

coating an organic film with said solution which has been irradiated with said electromagnetic waves in such a manner that said solution adheres on said organic film; and drying said solution adhering on said film;

thereby forming on said film an inorganic thin film, of an inorganic material, in which inorganic particles are dispersed.

28. Product formed by the process of claim 27.

29. A functional film comprising:

an organic film; and an inorganic thin film of an inorganic material in which a number of inorganic particles are dispersed, said inorganic thin film being formed on said organic film, wherein said inorganic thin film in which a number of inorganic particles is dispersed is a film formed by decomposing at least two different organometallic compounds, the inorganic particles being formed from at least one of the at least two different organometallic compounds, and the inorganic thin film being formed from at least another of the organometallic compounds.

30. A functional film comprising:

an organic film; and an inorganic thin film of an inorganic material in which a number of inorganic particles are dispersed, said inorganic thin film being formed on said organic film, and further comprising an inorganic adhesive bonding layer between the organic film and the inorganic thin film.

31. A functional film comprising:

an organic film; and an inorganic thin film of an inorganic material in which a number of inorganic particles are dispersed, said inorganic thin film being formed on said organic film, wherein said inorganic thin film includes a plurality of different layers, having different refractive indices, said inorganic thin film being an antireflection film.

32. A functional film comprising:

an organic film; and an inorganic thin film of an inorganic material in which a number of inorganic particles are dispersed, said inorganic thin film being formed on said organic film, wherein the organic film has been treated with a silane coupling agent prior to forming the inorganic thin film on the organic film.

33. A functional film comprising:

an organic film; and an inorganic thin film of an inorganic material in which a number of inorganic particles are dispersed, said inorganic thin film being formed on said organic film, wherein said inorganic thin film is a film formed by reactions of a sol solution of a metal alkoxide.

34. A process for producing a functional film, comprising:

a step of coating an organic film with a first sol solution in which first inorganic particles are dispersed;

a step of drying the first sol solution on the organic film;

a step of coating a film of dried first sol solution with a second sol solution in which second inorganic particles are dispersed; and a step of irradiating the first and second sol solutions on the organic film with electromagnetic waves.

35. A process for producing a functional film, comprising:

a step of coating an organic film with a first sol solution which includes a first organometallic compound;

a step of drying the first sol solution on the organic film;

a step of coating a film of dried first sol solution with a second sol solution which includes a second organometallic compound; and a step of irradiating the first and second sol solutions on the organic film with electromagnetic waves, wherein said first organometallic compound forms a first inorganic particle, and said second organometallic compound forms a second inorganic particle.

* * * * *